(12) United States Patent
Williams et al.

(10) Patent No.: US 7,145,719 B2
(45) Date of Patent: Dec. 5, 2006

(54) OPTICAL CORES AND PROJECTION SYSTEMS CONTAINING THE OPTICAL CORE

(75) Inventors: Jennifer L. Williams, Woodbury, MN (US); Kenneth D. Sabota, St. Paul, MN (US); Charles L. Bruzzone, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 312 days.

(21) Appl. No.: 10/338,469

(22) Filed: Jan. 8, 2003

(65) Prior Publication Data

US 2004/0130784 A1 Jul. 8, 2004

(51) Int. Cl.
*G02B 27/28* (2006.01)
*G02B 5/30* (2006.01)

(52) U.S. Cl. ....................... 359/496; 359/483

(58) Field of Classification Search ................ 359/485, 359/494, 237, 484, 483, 496; 353/31; 385/96
See application file for complete search history.

(56) References Cited

U.S. PATENT DOCUMENTS

| | | | |
|---|---|---|---|
| 5,882,774 A | 3/1999 | Jonza et al. | |
| 5,962,114 A | 10/1999 | Jonza et al. | |
| 6,375,330 B1 * | 4/2002 | Mihalakis | 353/31 |
| 6,652,162 B1 * | 11/2003 | Presley | 385/96 |
| 6,717,706 B1 * | 4/2004 | Miller et al. | 359/237 |
| 2003/0016334 A1 | 1/2003 | Weber et al. | |
| 2003/0038923 A1 | 2/2003 | Aastuen et al. | |
| 2003/0048423 A1 | 3/2003 | Aastuen et al. | |

FOREIGN PATENT DOCUMENTS

JP         411038365 A  *  2/1999

* cited by examiner

*Primary Examiner*—Drew A. Dunn
*Assistant Examiner*—Joshua L. Pritchett
(74) *Attorney, Agent, or Firm*—George W. Jonas

(57) ABSTRACT

LCD projection systems that use reflective LCD imager units commonly use one or more polarization beamsplitters to separate the light incident on the imager from the light reflected by one or more respective imagers. The polarizing beamsplitters can be mounted onto a color combiner using an index matching layer and optical adhesive.

17 Claims, 2 Drawing Sheets

OPTICAL CORES AND PROJECTION SYSTEMS CONTAINING THE OPTICAL CORE

FIELD OF THE INVENTION

The present invention is directed generally to systems for displaying information, and more particularly to reflective projection systems.

BACKGROUND

Optical imaging systems typically include a transmissive or a reflective imager, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers rotate the polarization of incident light. In other words, polarized light is either reflected by the imager with its polarization state substantially unmodified for the darkest state, or with a degree of polarization rotation imparted to provide a desired gray scale. A 90° rotation provides the brightest state in these systems. Accordingly, a polarized light beam is generally used as the input beam for reflective LCD imagers. A desirable compact arrangement includes a folded light path between a polarizing beamsplitter (PBS) and the imager, wherein the illuminating beam and the projected image reflected from the imager share the same physical space between the PBS and the imager. The PBS separates the incoming light from the polarization-rotated image light. A single imager may be used for forming a monochromatic image or a color image. Multiple imagers are typically used for forming a color image, where the illuminating light is split into multiple beams of different color. An image is imposed on each of the beams individually, which are then recombined to form a full color image.

It is desirable to use as much light generated by the light source as possible. In particular, it is useful to consider cost-effective and manufacturable configurations that reduce unwanted reflections of light.

SUMMARY OF THE INVENTION

In general, the inventions relate to optical elements or cores for projection systems and the projection systems containing the optical elements or cores. In addition, the inventions relate to making and using the optical elements or cores and the projections systems.

One embodiment is an optical element including a color combiner, a polarizing beamsplitter having a prism, an index matching layer disposed on a surface of the prism of the polarizing beamsplitter, and an optical adhesive layer disposed between the index matching layer and a surface of the color combiner to mount the polarizing beamsplitter onto the color combiner. Optionally, the optical element includes two or three (or more) polarizing beamsplitters each individually mounted on a different surface of the prism using an optical adhesive layer and an index matching layer. In addition, a polarization rotating element, such as a half-wave retardation plate, can optionally be mounted between each of one or more of the polarizing beamsplitters and the color combiner using a second optical adhesive layer between the polarization rotating element and the color combiner.

Generally, when the color combiner has an index of refraction, $n_1$ and the prism of the polarizing beamsplitter has an index of refraction, $n_2$, the index matching layer has an index of refraction, $n_3$, where $n_3$ is preferably within ±5% of $(n_1 * n_2)^{1/2}$ (i.e., the square root of the product of $n_1$ and $n_2$). In some embodiments, $n_3$ is within ±4% or ±2% of $(n_1 * n_2)^{1/2}$ and $n_3$ can be, in some instances, equal to $(n_1 * n_2)^{1/2}$.

Other embodiments include projection systems that include the optical element described above.

Yet another embodiment is a method of making an optical element. The method includes disposing an index matching layer on a surface of a prism of a polarizing beamsplitter. The polarizing beamsplitter is mounted onto a color combiner with an optical adhesive layer between the index matching layer and a surface of the color combiner. This method can optionally be used to mount two, three, or more polarizing beamsplitters onto different surfaces of a color combiner. Optionally, a polarization rotating element or elements can be mounted individually between each of one or more of the polarizing beamsplitters and the color combiner using a second optical adhesive layer between the polarization rotating element and the color combiner.

BRIEF DESCRIPTION OF THE DRAWINGS

The invention may be more completely understood in consideration of the following detailed description of various embodiments of the invention in connection with the accompanying drawings, in which.

Figure 1:
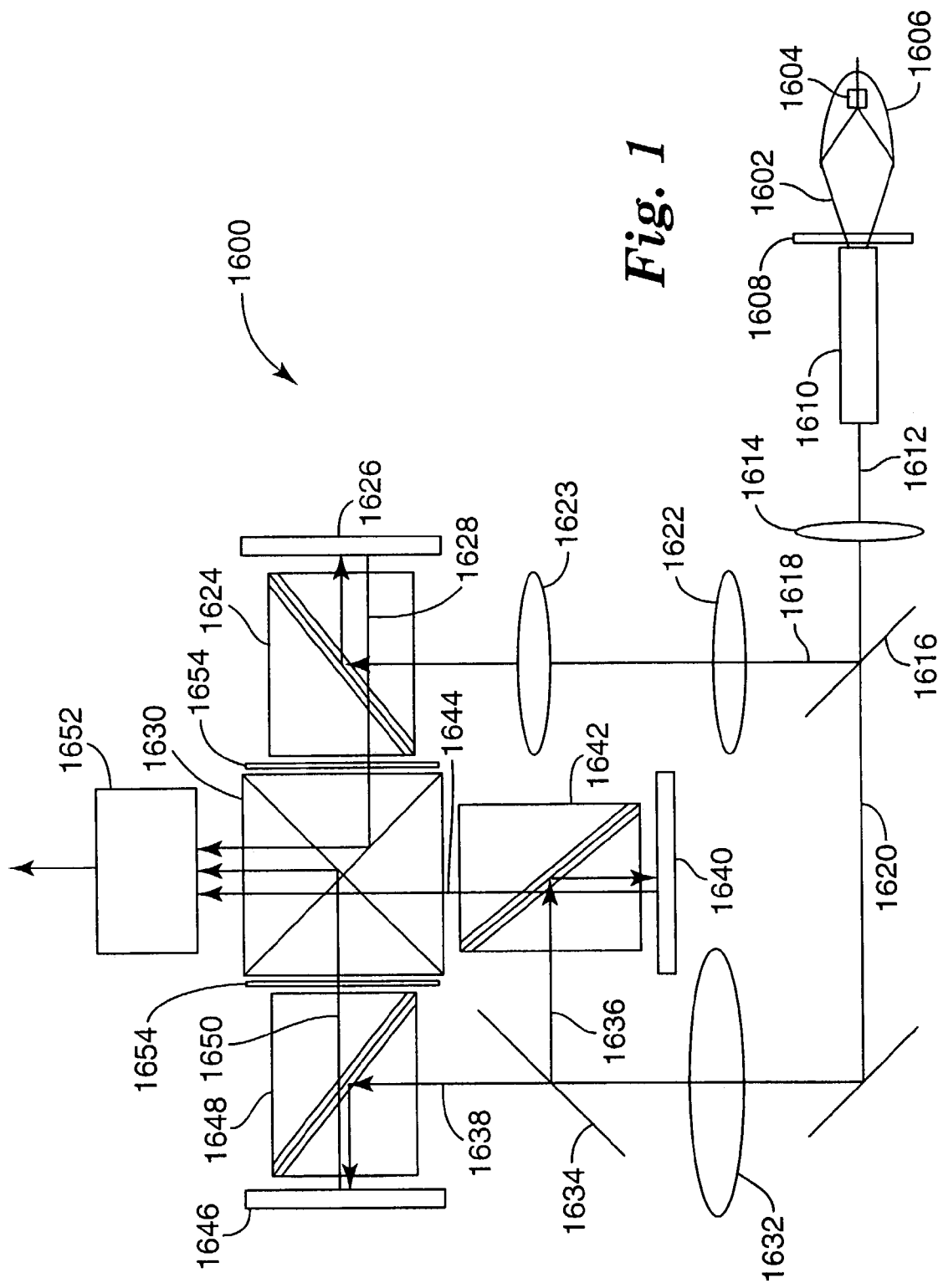
FIG. 1 schematically illustrates a projection system, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to projection systems and optical elements or cores for such systems. The term projection system as used herein is meant to include a wide variety of optical systems that produce an image for a viewer to view, that may be used in, for example, front and rear projection systems, projection displays, head-mounted displays, virtual viewers, heads-up displays, optical computing systems, optical correlation systems and other optical viewing and display systems.

An embodiment of a multi-imager projection system 1600 is schematically illustrated in FIG. 1. Light 1602 is emitted from a source 1604. The source 1604 may be an arc or filament lamp, or any other suitable light source for generating light suitable for projecting images. The source 1604 may be surrounded by a reflector 1606, such as an elliptic reflector (as shown) a parabolic reflector, or the like, to increase the amount of light directed towards the projection engine.

The light 1602 is typically treated before being split into different color bands. For example, the light 1602 may be passed through an optional pre-polarizer 1608, so that only light of a desired polarization is directed towards the projection engine. The pre-polarizer is optionally in the form of a reflective polarizer, so that reflected light, in the unwanted polarization state, is redirected to the light source 1604 for re-cycling. The light 1602 may also be homogenized so that the imagers in the projection engine are uniformly illuminated. One approach to homogenizing the light 1602 is to pass the light 1602 through a reflecting tunnel 1610, although it will be appreciated that other approaches to homogenizing the light may also be employed.

In the illustrated embodiment, the homogenized light 1612 passes through a first lens 1614 to reduce the divergence angle. The light 1612 is then incident on a first color separator 1616, which may be, for example, a dielectric thin film filter. The first color separator 1616 separates light 1618 in a first color band from the remaining light 1620.

The light 1618 in the first color band may be passed through a second lens 1622, and optionally a third lens 1623, to control the divergence of the light 1618 in the first color band incident on the first polarizing beamsplitter (PBS) 1624. The light 1618 passes from the first PBS 1624 to a first imager 1626. The imager reflects image light 1628 in a polarization state that is transmitted through the PBS 1624 to a color combiner, for example, an x-cube color combiner 1630 as illustrated in FIG. 1. The PBS 1624 may provide astigmatism compensation to the reflected image light. The imager 1626 may include one or more compensation elements, such as a retarder element, to provide additional polarization rotation and thus increase or maximize contrast in the image light.

The remaining light 1620 may be passed through a third lens 1632. The remaining light 1620 is then incident on a second color separator 1634, for example a thin film filter or the like, to produce a light beam 1636 in a second color band and a light beam 1638 in a third color band. The light 1636 in the second color band is directed to a second imager 1640 via a second PBS 1642. The second PBS 1642 may provide astigmatism compensation to light in the second color band. The second imager 1640 directs image light 1644 in the second color band to the x-cube color combiner 1630.

The light 1638 in the third color band is directed to a third imager 1646 via a third PBS 1648. The third PBS 1648 may provide astigmatism compensation to light in the third color band. The third imager 1646 directs image light 1650 in the third color band to the x-cube color combiner 1630.

The image light 1628, 1644 and 1650 in the first, second and third color bands is combined in the x-cube color combiner 1630 and directed as a full color image beam to projection optics 1652. Polarization rotating optics 1654, for example half-wave retardation plates or the like, may be provided between the PBS's 1624, 1642 and 1648 and the x-cube color combiner 1630 to control the polarization of the light combined in the x-cube color combiner 1630. In the illustrated embodiment, polarization rotating optics 1654 are disposed between the x-cube color combiner 1630 and the first PBS and third PBS's 1624 and 1648.

One example of a suitable PBS is the wide-angle Cartesian polarization beamsplitter (PBS), as discussed in U.S. Pat. No. 6,486,997, incorporated herein by reference. However, other PBS's that incorporate prisms can be used. A Cartesian PBS is a PBS in which the polarization of separate beams is referenced to invariant, generally orthogonal, principal axes of the PBS film. In contrast, with a non-Cartesian PBS, the polarization of the separate beams is substantially dependent on the angle of incidence of the beams on the PBS. The PBS can also incorporate an element, such as an inclined plate or high index layer, to provide astigmatism correction as described in U.S. patent application Ser. Nos. 09/878,559 and 10/159,694, both of which are incorporated herein by reference. U.S. patent application Ser. Nos. 09/878,559 and 10/159,694 also describe a variety of imager system configurations that can be modified according to the present invention to include the optical adhesive layer(s) and index matching layer so that a PBS can be mounted onto an x-cube color combiner, as described below.

An example of a Cartesian PBS is a multilayer, reflective polarizing beamsplitter (MRPB) film, which is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction and the y-refractive index is the refractive index in the birefringent material for light having its electric vector parallel to the y-direction. The x-refractive index of the birefringent material is substantially the same as the refractive index of the isotropic material, whereas the y-refractive index of the birefringent material is different from that of the isotropic material. If the layer thicknesses are chosen correctly, the film reflects visible light polarized in the y-direction and transmits light polarized in the x-direction.

One example of an MRPB film is a matched z-index polarizer (MZIP) film, in which the z-refractive index of the birefringent material is substantially the same as either the x-refractive index or the y-refractive index of the birefringent material. The MZIP film has been described in U.S. Pat. Nos. 5,882,774 and 5,962,114, both of which are incorporated by reference. An improved type of MZIP film, having increased lifetime, uses PET/COPET-PCTG as the alternating layers, as is described in U.S. patent application Ser. No. 09/878,575, incorporated herein by reference.

As indicated above, one embodiment of Cartesian PBS is an MRPB film, such as an MZIP film, encased between prisms. In order to reduce or minimize the birefringence resulting from thermally induced stresses caused by high intensity light beams, the prisms are preferably formed from a material having a low stress-optic coefficient. One of the most suitable materials for this purpose are glasses marketed under the names SF57 (Schott Glass Technologies, Mainz, Germany), PBH55 (Ohara Corporation, Kanagawa, Japan), or PBH56 (Ohara Corporation). These glasses have a refractive index of about 1.85.

When this low index glass is used, the refractive index of the MRPB film is typically less than that of the surrounding prisms. For example, the refractive index of an MZIP film is approximately 1.56, and its thickness is typically around 125 µm. In assembling the PBS, the MRPB film is attached to the prism faces using approximately 25 µm thick glue on each side of the film, with a matching refractive index of about 1.56. One particularly suitable type of glue for use with an MRPB film has been found to be Norland 61, manufactured by the Norland Corporation. Together, the PBS film and the glue form an inclined plate of refractive index of about 1.56 and thickness 225 µm, lying an angle of about 45° to the propagation direction of the light. This relatively low index plate, within relatively higher index prisms introduces astigmatism to the image light. Astigmatism is a problem for light that has been reflected by an imager. Constructions for reducing astigmatism, including the introduction of an inclined plane of high index material (such as a glass slab) between the MZIP film and one of the prisms, are described in, for example, U.S. patent application Ser. Nos. 09/878,559 and 10/159,694, both of which are incorporated herein by reference.

Figure 2:
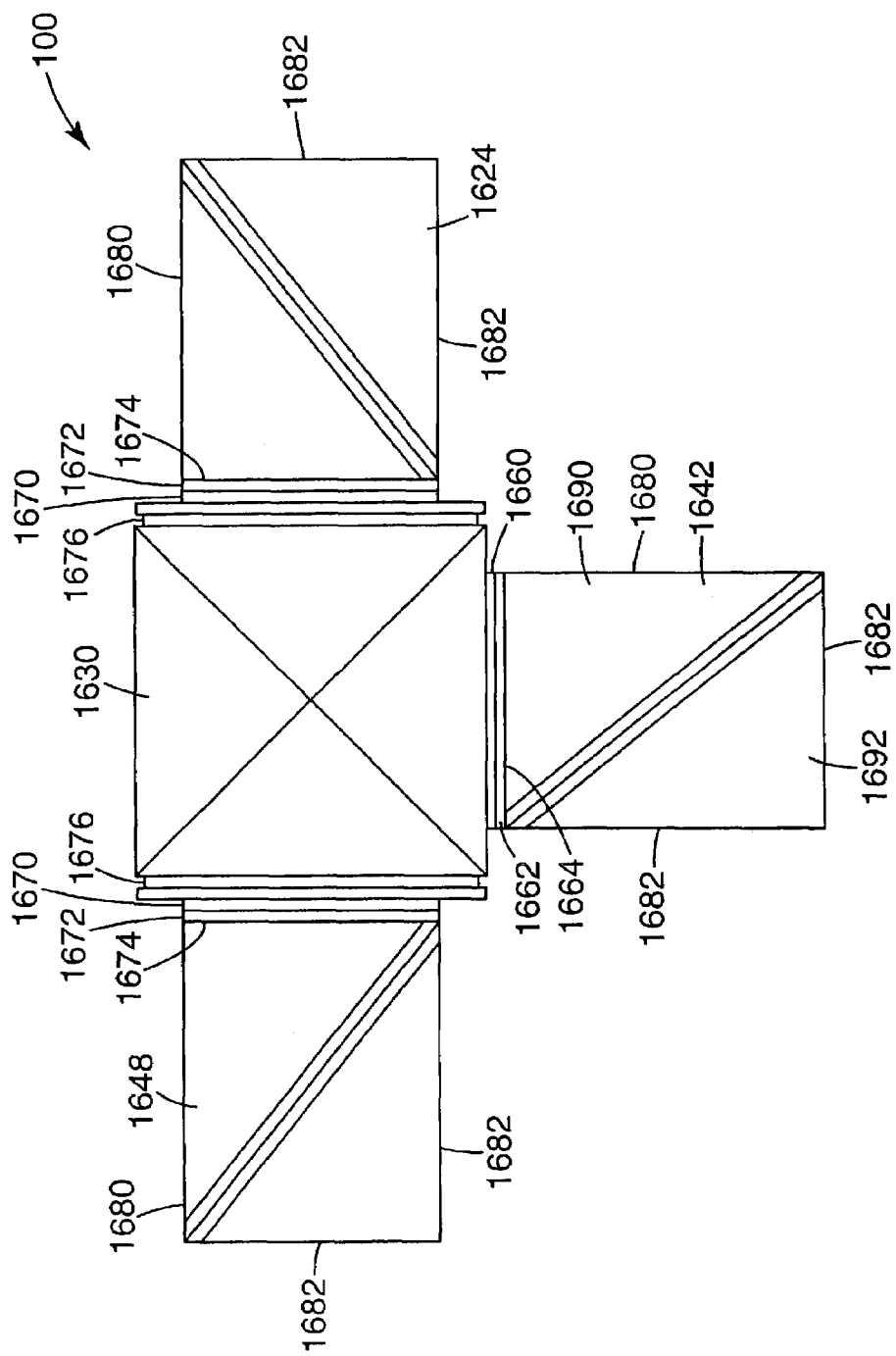
FIG. 2 schematically illustrates an optical element of the projection system of FIG. 1, according to an embodiment of the present invention.

An optical element or core 100 is schematically shown in FIG. 2 to illustrate the mounting of the x-cube color combiner 1630; PBS's 1624, 1642, and 1648; and polarization rotating optics 1654. In particular, PBS 1642 is mounted onto the x-cube color combiner 1630 using a layer 1660 of optical adhesive and an index matching layer 1662 disposed on a surface 1664 of the PBS 1642. PBS's 1624 and 1648 are mounted onto the x-cube color combiner 1630 using an index matching layer 1672 disposed on a surface 1674 of the respective PBS's, a first optical adhesive layer 1670, and a second optical adhesive layer 1676 with the polarization rotating optics 1654 disposed between the first and second optical adhesive layers. The optical adhesive layers 1660, 1670, and 1676 can use the same or a different optical adhesive. Whether polarization rotating optics is disposed between a particular PBS and the color combiner is typically determined by desired light path and the polarization of light along that path.

This arrangement is provided to reduce reflectivity at the barriers between materials. In particular, the material (for example, glass such as BK7 or B270 glass) of the x-cube color combiner 1630 has an index of refraction, $n_1$, and the material (for example, glass) that forms the prisms 1690, 1692 of the respective PBS 1624, 1642, or 1648 has an index of refraction, $n_2$. These two indices of refraction can be substantially different (for example, $|n_1-n_2|>0.2$). In general, the larger the difference, the greater the potential reflectivity at the interface. Typically, the index of the optical adhesive layers 1660, 1670, and 1676 is selected to be substantially the same as $n_1$. Generally, the indices of refraction of the optical adhesive layers differ from $n_1$ by no more than 0.1 and typically by no more than 0.04. In addition, the polarization rotating optics 1654 (for example, a half-wave plate) is typically selected to have an index of refraction that is substantially the same as $n_1$ (e.g., the index of the polarization rotating optics differs from $n_1$ by no more than 0.1 and, preferably, by no more than 0.04).

The index matching layers 1662, 1672 are disposed on the respective PBS's and are selected to have an index of refraction $n_3$ where $$n_3 \approx (n_1 * n_2)^{1/2}.$$

Ideally, $n_3$ is equal the value on the right-hand side of the equation. However, it is generally acceptable to allow some variation from this ideal value because changes in device properties are acceptable for such deviations. The amount of variation can depend on the application, however, generally $n_3$ can differ from $(n_1 * n_2)^{1/2}$ by ±5% and typically $n_3$ is within ±4% and often within ±2%. In one particular example, the x-cube color combiner has an index of refraction of 1.52, the glass prisms of the PBS have an index of refraction of 1.85, and the index matching layer has an index of refraction in the range of 1.6 to 1.76, preferably in the range of 1.62 to 1.74, and more preferably in the range of 1.65 to 1.7. The optical adhesive used in this example has an index of 1.56 and the half wave plate has an index of approximately 1.6.

The index matching layer can be made using any material that has the requisite index of refraction and is substantially transmissive (at least 95% transmissive and preferably at least 98% transmissive) over the wavelength range of interest (typically over the visible spectrum or at least over the portion of the spectrum, e.g., red, green, or blue portions of the spectrum, directed at the particular PBS). The index matching layer is typically formed on the appropriate surface of the PBS. Formation of the index matching layer can be performed by techniques such as, for example, evaporation, sputtering, ion plating, ion assisted evaporation, and the like.

In one embodiment, surfaces 1682 of PBS's 1624, 1642, and 1648 are covered with an antireflection layer. A variety of materials for used in antireflection layers and methods for disposing the antireflection layer on prism surfaces are known and can generally be used. Light this is being guided to through the projection system for display on a screen is not generally directed toward or away from surfaces 1680 of PBS's 1624, 1642, and 1648. Optionally, these surfaces 1680 do not need to be finished (for example, made clear) or covered with an antireflection coating. For example, the surfaces 1680 can be ground glass surfaces. This can reduce the cost of the PBS, as well as facilitate distinguishing prism 1690 from prism 1692 during assembly of the core 100. It is important to be able to distinguish the two prisms 1690, 1692 because 1690 includes the index matching layer 1662 or 1672 disposed on the surface of the prism.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:
1. An optical element, comprising:
a color combiner;
a polarizing beamsplitter comprising a prism;
an index matching layer disposed on a surface of the prism of the polarizing beamsplitter;
an optical adhesive layer disposed between the index matching layer and a surface of the color combiner to mount the polarizing beamsplitter onto the color combiner; and
wherein the color combiner has an index of refraction, $n_1$; the prism of the polarizing beamsplitter has an index of refraction, $n_2$; and the index matching layer has an index of refraction, $n_3$, wherein $n_3$ is within ±4% of $(n_1 * n_2)^{1/2}$.
2. The optical element of claim 1, further comprising
a polarization rotating element disposed between the optical adhesive layer and the color combiner; and
a second optical adhesive layer disposed between the polarization rotating element and the color combiner.
3. The optical element of claim 2, wherein the polarization rotating element comprises a half-wave retardation plate.
4. The optical element of claim 1, wherein the optical element comprises at least two polarizing beamsplitters with individual index matching layers and optical adhesive layers associated with each of the polarizing beamsplitters to mount each polarizing beamsplitter to a different surface of the color combiner.

5. The optical element of claim 1, further comprising
a second polarizing beamsplitter comprising a prism;
a second index matching layer disposed on a surface of the prism of the second polarizing beamsplitter;
a second optical adhesive layer disposed between the second index matching layer and a second surface of the color combiner to mount the second polarizing beamsplitter onto the color combiner; and
a third polarizing beamsplitter comprising a prism;
a third index matching layer disposed on a surface of the prism of the third polarizing beamsplitter; and
a third optical adhesive layer disposed between the third index matching layer and a third surface of the color combiner to mount the third polarizing beamsplitter onto the color combiner.

6. The optical element of claim 5, further comprising
a first polarization rotating element disposed between the second optical adhesive layer and the color combiner;
a fourth optical adhesive layer disposed between the first polarization rotating element and the color combiner;
a second polarization rotating element disposed between the third optical adhesive layer and the color combiner; and
a fifth optical adhesive layer disposed between the second polarization rotating element and the color combiner.

7. The optical element of claim 1, wherein $n_3$ is within ±2% of $(n_1 * n_2)^{1/2}$.

8. The optical element of claim 1, wherein $n_3$ is equal to $(n_1 * n_2)^{12}$.

9. A projection system comprising the optical element of claim 1.

10. A method of making an optical element, the method comprising:
disposing an index matching layer on a surface of a prism of a polarizing beamsplitter;
mounting the polarizing beamsplitter onto a color combiner with an optical adhesive layer between the index matching layer and a surface of the color combiner; and
wherein the color combiner has an index of refraction, $n_1$;
the prism of the polarizing beamsplitter has an index of refraction, $n_2$; and the index matching layer has an index of refraction, $n_3$, wherein $n_3$ is within ±4% of $(n_1 * n_2)^{1/2}$.

11. The method of claim 10, further comprising mounting a polarization rotating element between the adhesive layer and the color combiner using a second optical adhesive layer between the polarization rotating element and the color combiner.

12. The method of claim 11, wherein the polarization rotating element comprises a half-wave retardation plate.

13. The method of claim 10, further comprises repeating the disposing and mounting steps to mount at least one additional polarizing beamsplitter onto the color combiner.

14. The method of claim 10, further comprising
disposing a second index matching layer on a surface of a prism of a second polarizing beamsplitter;
mounting the second polarizing beamsplitter onto the color combiner with a second optical adhesive layer between the second index matching layer and a second surface of the color combiner;
disposing a third index matching layer on a surface of a prism of a third polarizing beamsplitter; and
mounting the third polarizing beamsplitter onto the color combiner with a third optical adhesive layer between the third index matching layer and a third surface of the color combiner.

15. The method of claim 14, further comprising
mounting a first polarization rotating element between the second adhesive layer and the color combiner using a fourth optical adhesive layer between the first polarization rotating element and the color combiner; and
mounting a second polarization rotating element between the third adhesive layer and the color combiner using a fifth optical adhesive layer between the second polarization rotating element and the color combiner.

16. The method of claim 1, wherein $n_3$ is within ±2% of $(n_1 * n_2)^{1/2}$.

17. The method of claim 1, wherein $n_3$ is equal to $(n_1 * n_2)^{1/2}$.

* * * * *

UNITED STATES PATENT AND TRADEMARK OFFICE
CERTIFICATE OF CORRECTION

| | | |
|---|---|---|
| PATENT NO. | : 7,145,719 B2 | Page 1 of 1 |
| APPLICATION NO. | : 10/338469 | |
| DATED | : December 5, 2006 | |
| INVENTOR(S) | : Jennifer L. Williams | |

It is certified that error appears in the above-identified patent and that said Letters Patent is hereby corrected as shown below:

In Col. 7, line 32, in Claim 8, delete "$(n_1*n_2)^{12}$." and insert -- $(n_1*n_2)^{1/2}$. --, therefor.

Signed and Sealed this

Twenty-seventh Day of February, 2007

JON W. DUDAS
*Director of the United States Patent and Trademark Office*